(12) United States Patent
Chellapilla et al.

(10) Patent No.: US 12,716,733 B2
(45) Date of Patent: Aug. 25, 2026

(54) SYSTEMS AND METHODS FOR AUTONOMOUS VEHICLE PERFORMANCE EVALUATION

(71) Applicant: Lyft, Inc., San Francisco, CA (US)

(72) Inventors: Kumar Hemachandra Chellapilla, Mountain View, CA (US); Emilie Jeanne Anne Danna, Sunnyvale, CA (US); David Tse-Zhou Lu, Menlo Park, CA (US); Sameer Qureshi, Sunnyvale, CA (US); Alexis Weill, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 129 days.

(21) Appl. No.: 18/595,266

(22) Filed: Mar. 4, 2024

(65) Prior Publication Data

US 2024/0344835 A1 Oct. 17, 2024

Related U.S. Application Data

(63) Continuation of application No. 16/700,835, filed on Dec. 2, 2019, now Pat. No. 11,953,333.

(Continued)

(51) Int. Cl.
*G01C 21/34* (2006.01)
*G06Q 10/02* (2012.01)

(Continued)

(52) U.S. Cl.
CPC ..... *G01C 21/3453* (2013.01); *G01C 21/3438* (2013.01); *G01C 21/3461* (2013.01);

(Continued)

(58) Field of Classification Search
CPC ........... G01C 21/3453; G01C 21/3438; G01C 21/3461; G06Q 10/02; G06Q 50/40;

(Continued)

(56) References Cited

U.S. PATENT DOCUMENTS 9,665,100 B2 5/2017 Shashua et al.
10,479,356 B1 11/2019 Haque et al.

(Continued)

FOREIGN PATENT DOCUMENTS

CN 1896687 A 1/2007

OTHER PUBLICATIONS

International Patent Application No. PCT/US2020/021225, Search Report and Written Opinion mailed Jul. 2, 2020, 12 pages.

(Continued)

*Primary Examiner* — Navid Z. Mehdizadeh
(74) *Attorney, Agent, or Firm* — Sheppard, Mullin, Richter & Hampton LLP

(57) ABSTRACT

Systems, methods, and non-transitory computer-readable media can receive transportation information associated with a transportation request, the transportation information comprising a pick up location and a drop off location. A first route associated with the transportation request and a non-autonomous vehicle can be determined. A second route associated with the transportation request and an autonomous vehicle can be determined based on an operating design domain (ODD) associated with one or more autonomous vehicles in a fleet of vehicles. At least one performance metric associated with the second route can be determined. The second route can be selected based at least in part on the at least one performance metric and a comparison of the first route and the second route. An autonomous vehicle from the fleet of vehicles can be assigned to the transportation request based on selection of the second route.

14 Claims, 11 Drawing Sheets

Related U.S. Application Data

(60) Provisional application No. 62/814,674, filed on Mar. 6, 2019.

(51) Int. Cl.
*G06Q 50/40* (2024.01)
*G07C 5/00* (2006.01)
*G07C 5/08* (2006.01)
*G08G 1/00* (2006.01)
*G08G 1/0968* (2006.01)

(52) U.S. Cl.
CPC ............ *G06Q 10/02* (2013.01); *G06Q 50/40* (2024.01); *G07C 5/008* (2013.01); *G07C 5/0808* (2013.01); *G07C 5/085* (2013.01); *G08G 1/096833* (2013.01); *G08G 1/207* (2013.01); *G08G 1/22* (2013.01)

(58) Field of Classification Search
CPC ...... G07C 5/008; G07C 5/0808; G07C 5/085; G08G 1/096833; G08G 1/207; G08G 1/22; G08G 1/0129; G08G 1/202
See application file for complete search history.

(56) References Cited

U.S. PATENT DOCUMENTS 10,482,003 B1 11/2019 Bondor et al.
10,789,835 B2 9/2020 Kislovskiy et al.
10,872,379 B1 12/2020 Nepomuceno et al.
11,107,358 B1 8/2021 Lyle
2014/0074402 A1 3/2014 Hassib et al.
2014/0156134 A1 6/2014 Cullinane et al.
2015/0175168 A1 6/2015 Hoye et al.
2015/0307107 A1 10/2015 Tamari et al.
2016/0167652 A1 6/2016 Slusar
2017/0234689 A1 8/2017 Gibson et al.
2017/0248949 A1 8/2017 Moran et al.
2017/0336213 A1 11/2017 Fowe et al.
2018/0059671 A1 3/2018 Sogen et al.
2018/0127000 A1 5/2018 Jiang et al.
2018/0315146 A1 11/2018 Matthiesen et al.
2018/0339714 A1 11/2018 Smid et al.
2018/0340790 A1 11/2018 Kislovskiy et al.
2019/0102692 A1 4/2019 Kwant et al.
2019/0146509 A1 5/2019 Dean et al.
2019/0163185 A1 5/2019 Bin-Nun
2019/0180628 A1 6/2019 Hayashi et al.
2019/0184898 A1 6/2019 Zheng et al.
2019/0186936 A1 6/2019 Ebner et al.
2019/0186947 A1 6/2019 Rockmore et al.
2019/0389482 A1 12/2019 Michalakis et al.
2020/0050198 A1 2/2020 Donnelly
2020/0319635 A1 10/2020 Andres et al.
2021/0048815 A1 2/2021 McErlean et al.
2021/0191394 A1 6/2021 Dudley et al.
2021/0387650 A1 12/2021 Li et al.
2022/0068052 A1 3/2022 Maeta et al.
2022/0126878 A1 4/2022 Moustafa et al.
2022/0161811 A1 5/2022 Lu et al.

OTHER PUBLICATIONS

Lv, Chen, et al., "Analysis of Autopilot Disengagements Occurring During Autonomous Vehicle Testing", IEEE/CAA Journal of Automatica Sinica, vol. 5, No. 1, Jan. 2018, pp. 58-68.
Corporate Partnership Board, "Safer Roads with Automated Vehicles?"; May 23, 2018; <URL: https://www.oecd.org/contenUdam/oecd/en/publications/reports/2018/05/safer-roads-with-automated-vehicles_d6af2540/b2881ccb-en.pdf>, (Year: 2018), 46 pages.
Mui, Chunka, "Driverless Cars and the '90-90 Rule'"; Mar. 19, 2018; <URL: https://www.insurancethoughtleadership.com/emerging-technologies/driverless-cars-and-90-90-rule#:-:text=A%20program-ming%20aphorism%20says%20the,of%20code% 20takes%20another% 2090%25>, Mar. 19, 2018 (Year: 2018), 9 pages.

Transportation Management System 202

Disengagement Categorization Module 204

Performance Metric Module 206

Utility Metric Module 208

Metric Utilization Module 210

Figure 5A:
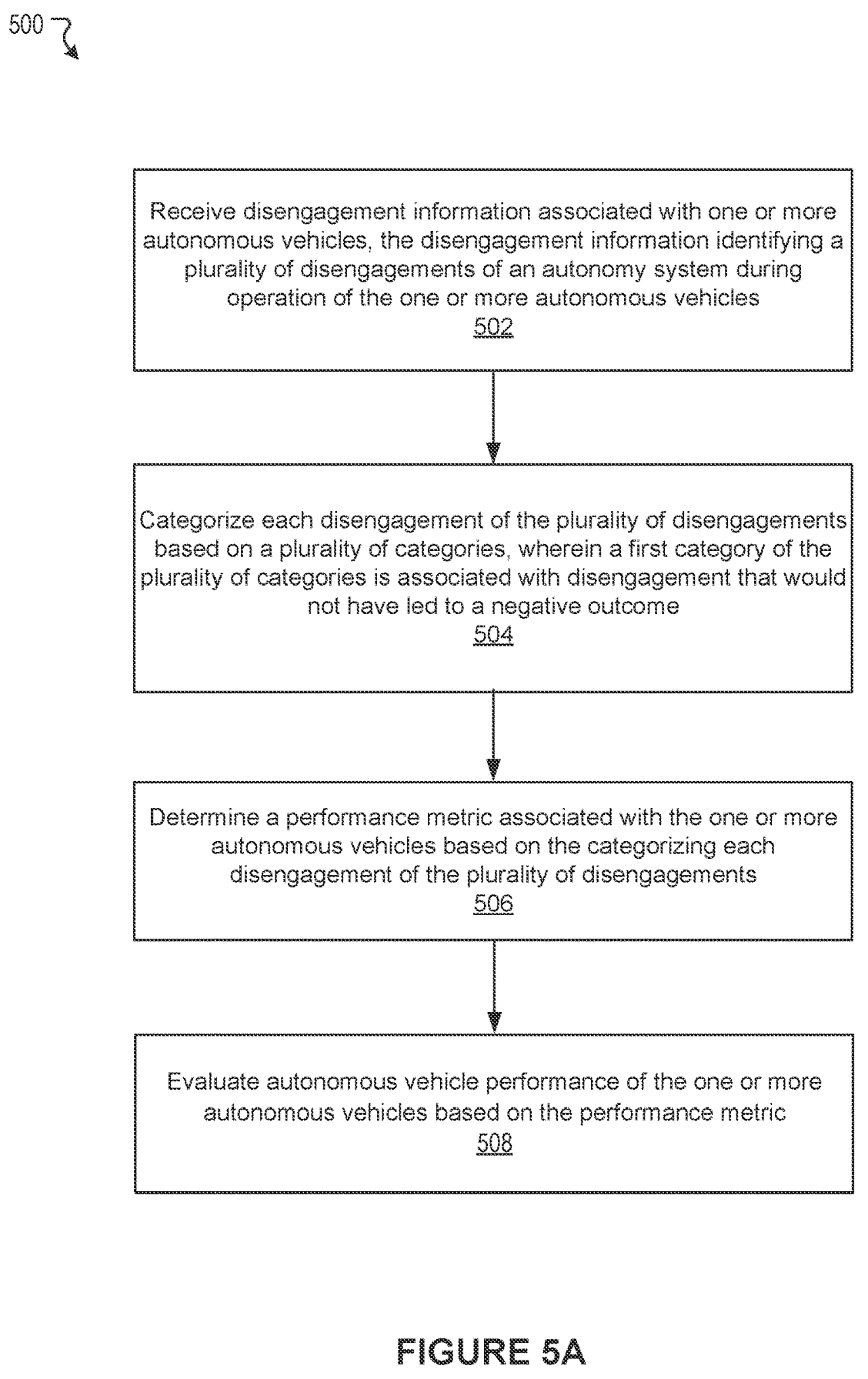

500

Receive disengagement information associated with one or more autonomous vehicles, the disengagement information identifying a plurality of disengagements of an autonomy system during operation of the one or more autonomous vehicles
502

Categorize each disengagement of the plurality of disengagements based on a plurality of categories, wherein a first category of the plurality of categories is associated with disengagement that would not have led to a negative outcome
504

Determine a performance metric associated with the one or more autonomous vehicles based on the categorizing each disengagement of the plurality of disengagements
506

Evaluate autonomous vehicle performance of the one or more autonomous vehicles based on the performance metric
508

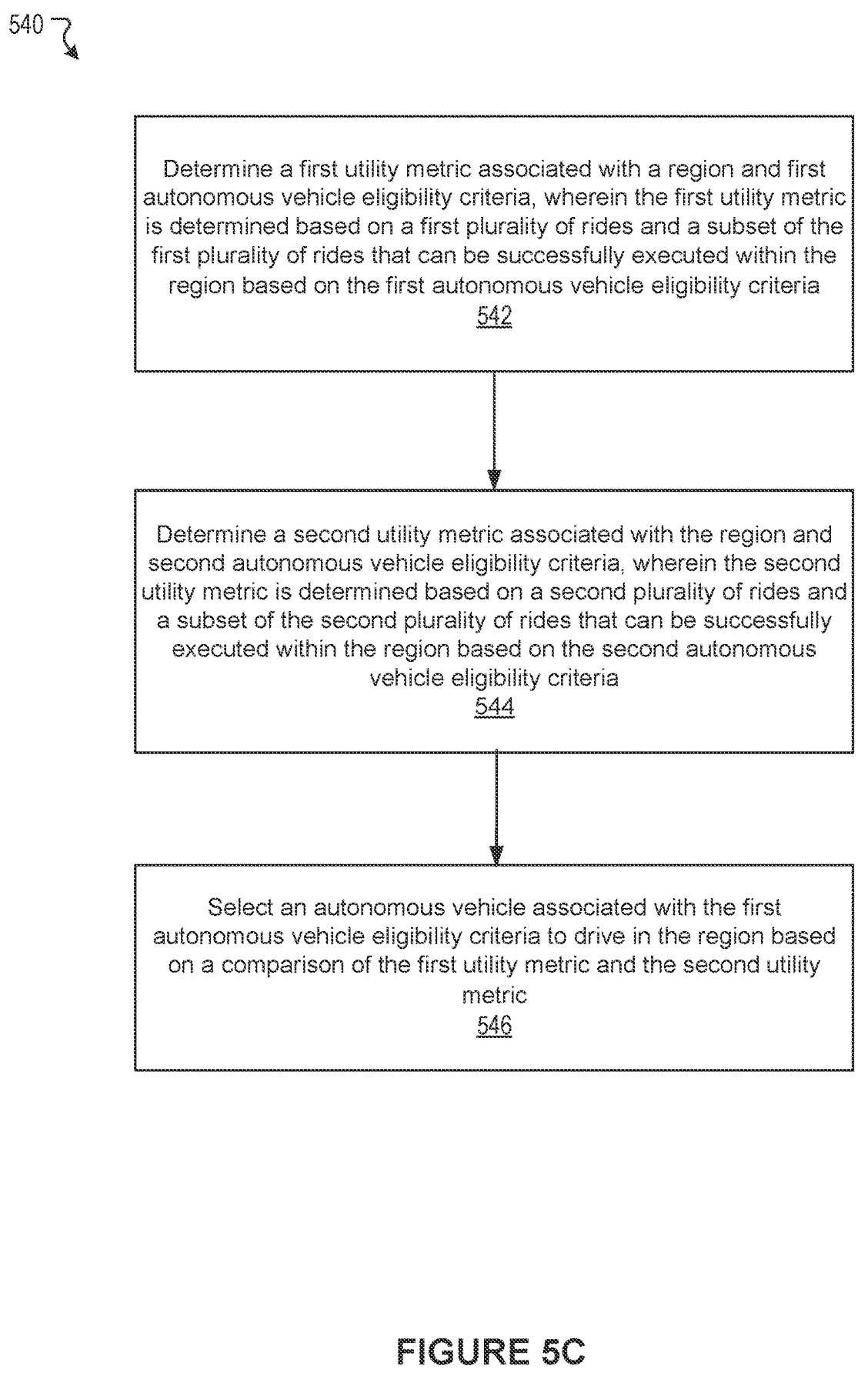

Determine a first utility metric associated with a region and first autonomous vehicle eligibility criteria, wherein the first utility metric is determined based on a first plurality of rides and a subset of the first plurality of rides that can be successfully executed within the region based on the first autonomous vehicle eligibility criteria
542

Determine a second utility metric associated with the region and second autonomous vehicle eligibility criteria, wherein the second utility metric is determined based on a second plurality of rides and a subset of the second plurality of rides that can be successfully executed within the region based on the second autonomous vehicle eligibility criteria
544

Select an autonomous vehicle associated with the first autonomous vehicle eligibility criteria to drive in the region based on a comparison of the first utility metric and the second utility metric
546

FIGURE 5C

SYSTEMS AND METHODS FOR AUTONOMOUS VEHICLE PERFORMANCE EVALUATION

CROSS-REFERENCE TO RELATED APPLICATIONS

The present application is a continuation of U.S. patent application Ser. No. 16/700,835, filed on Dec. 2, 2019, and entitled "SYSTEMS AND METHODS FOR AUTONOMOUS VEHICLE PERFORMANCE EVALUATION," which claims priority to U.S. Provisional Patent Application No. 62/814,674, filed on Mar. 6, 2019, and entitled "SYSTEMS AND METHODS FOR AUTONOMOUS VEHICLE PERFORMANCE EVALUATION," all of which are incorporated in their entireties herein by reference.

FIELD OF THE INVENTION

The present technology relates to autonomous vehicle systems. More particularly, the present technology relates to systems, apparatus, and methods for autonomous vehicle performance evaluation.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have sensors that can recognize hazards, roads, lane markings, traffic signals, and the like. Data from sensors may be used to, for example, safely drive the vehicle, activate certain safety features (e.g., automatic braking), and generate alerts about potential hazards.

SUMMARY

Various embodiments of the present technology can include systems, methods, and non-transitory computer readable media configured to receive disengagement information associated with one or more autonomous vehicles, the disengagement information identifying a plurality of disengagements of an autonomy system during operation of the one or more autonomous vehicles. Each disengagement of the plurality of disengagements can be categorized based on a plurality of categories, wherein a first category of the plurality of categories is associated with disengagement that would not have led to a negative outcome. A performance metric associated with the one or more autonomous vehicles can be determined based on the categorizing each disengagement of the plurality of disengagements. Autonomous vehicle performance of the one or more autonomous vehicles can be evaluated based on the performance metric.

In an embodiment, the determining the performance metric associated with the one or more autonomous vehicles based on the categorizing each disengagement of the plurality of disengagements comprises: determining a plurality of per-road-segment performance metrics for a plurality of road segments.

In an embodiment, the determining the performance metric associated with the one or more autonomous vehicles further comprises: determining a calibrated performance metric associated with the one or more autonomous vehicles based on a weighted average of the plurality of per-road-segment performance metrics.

In an embodiment, each per-road-segment performance metric of the plurality of per-road-segment performance metrics is associated with a respective road segment of a plurality of road segments, and each per-road segment performance metric is weighted based on a frequency with which the associated road segment was traveled by a transportation network.

In an embodiment, the plurality of road segments comprise each road segment in a geographic region defined by an operation design domain (ODD) associated with the one or more autonomous vehicles.

In an embodiment, the plurality of disengagements are filtered to remove all planned disengagements, wherein the planned disengagements include disengagements that are expected based on the ODD.

In an embodiment, the categorizing each disengagement of the plurality of disengagements based on a plurality of categories comprises identifying each unplanned disengagement of the plurality of disengagements and categorizing each unplanned disengagement into a category of the plurality of categories.

In an embodiment, the categorizing each disengagement of the plurality of disengagements is performed by a human operator based on a determination of a likely outcome had the disengagement not occurred.

In an embodiment, the categorizing each disengagement of the plurality of disengagements is performed based on a digital simulation and a simulated determination of a likely outcome had the disengagement not occurred.

In an embodiment, wherein the ODD is defined based on at least one of environmental factors, map elements, or scenarios that the one or more autonomous vehicles are designed to handle.

Various embodiments of the present technology can include systems, methods, and non-transitory computer readable media configured to receive transportation information associated with a transportation request, the transportation information comprising a pick up location and a drop off location. A first route associated with the transportation request and a non-autonomous vehicle can be determined. A second route associated with the transportation request and an autonomous vehicle can be determined based on an operating design domain (ODD) associated with one or more autonomous vehicles in a fleet of vehicles. At least one performance metric associated with the second route can be determined. The second route can be selected based at least in part on the at least one performance metric and a comparison of the first route and the second route. An autonomous vehicle from the fleet of vehicles can be assigned to the transportation request based on selection of the second route.

In an embodiment, the ODD is defined based on at least one of environmental factors, map elements, or scenarios that the one or more autonomous vehicles are designed to handle.

In an embodiment, the performance metric is a safety metric determined based on disengagement information.

In an embodiment, the selecting the second route comprises determining, for each road segment of a plurality of road segments associated with the second route, a performance metric based on disengagement information associated with the road segment.

In an embodiment, the disengagement information associated with each road segment identifies a set of disengagements associated with the road segment.

In an embodiment, the determining the performance metric based on disengagement information associated with the road segment comprises categorizing each disengagement of the set of disengagements into a category of a plurality of categories.

In an embodiment, each category of the plurality of categories is associated with a particular predicted outcome if disengagement had not occurred.

In an embodiment, the determining, for each road segment of a plurality of road segments, a performance metric based on disengagement information associated with the road segment comprises determining, for each road segment of the plurality of road segments, a performance metric based on unplanned disengagement information associated with the road segment.

In an embodiment, the selecting the second route comprises a determination as to whether a route comprising one or more road segments of the plurality of road segments exists from the pick up location to the drop off location such that each road segment in the route satisfies a minimum performance metric threshold.

In an embodiment, the selecting the second route comprises: evaluating at least one of a potential time delay, a distance between a current location and the pickup location, a distance from the drop off location to a destination, or comfort level.

Various embodiments of the present technology can include systems, methods, and non-transitory computer readable media configured to determine a first utility metric associated with a region and first autonomous vehicle eligibility criteria, wherein the first utility metric is determined based on a first plurality of rides and a subset of the first plurality of rides that can be successfully executed within the region based on the first autonomous vehicle eligibility criteria. A second utility metric associated with the region and second autonomous vehicle eligibility criteria can be determined, wherein the second utility metric is determined based on a second plurality of rides and a subset of the second plurality of rides that can be successfully executed within the region based on the second autonomous vehicle eligibility criteria. An autonomous vehicle associated with the first autonomous vehicle eligibility criteria can be selected to drive in the region based on a comparison of the first utility metric and the second utility metric.

In an embodiment, the determining the first utility metric comprises: weighting the plurality of rides based on distances associated with the first plurality of rides; and weighting the subset of rides based on distances associated with the subset of rides.

In an embodiment, the first autonomous vehicle eligibility criteria comprises operational design domain-based (ODD-based) criteria, wherein the ODD-based criteria comprises, for each ride of the first plurality of rides, a determination as to whether a route exists from a pick up location to a drop off location within a region defined by an ODD associated with one or more autonomous vehicles.

In an embodiment, the subset of rides are defined as all rides of the first plurality of rides that satisfy the ODD-based criteria.

In an embodiment, the first autonomous vehicle eligibility criteria further comprises performance metric-based criteria associated with a plurality of road segments of a route connecting the pick up location and the drop off location, wherein the determining a subset of rides comprises: determining that the route meets the ODD-based criteria and that the plurality of road segments meets the performance metric-based criteria; and including rides associated with the route in the subset of the rides.

In an embodiment, a performance metric is determined for each road segment of the plurality of road segments based on disengagement information associated with the road segment.

In an embodiment, the determining the subset of rides further comprises: determining a plurality of scenarios associated with the ODD; determining respective exposure frequencies associated with the plurality of scenarios; and determining the subset of rides based on a number of the first plurality of rides and the respective exposure frequencies.

In an embodiment, the determining the determining the first utility metric is based at least in part on a ratio associated with a number of rides of the first plurality of rides and a number of rides of the subset of the first plurality of rides.

In an embodiment, the performance metric-based criteria comprises, for each ride of the first plurality of rides, a determination as to whether a route comprising one or more road segments of the plurality of road segments exists from the pick up location to the drop off location such that each road segment in the route satisfies a minimum performance metric threshold.

In an embodiment, the determining the first utility metric comprises: evaluating at least one of a potential time delay, a distance between a current location and the pickup location, a distance from the drop off location to a destination, or comfort level.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIG. 5A illustrates an example method, according to an embodiment of the present technology.

FIG. 5C illustrates an example method, according to an embodiment of the present technology.

Figure 1:
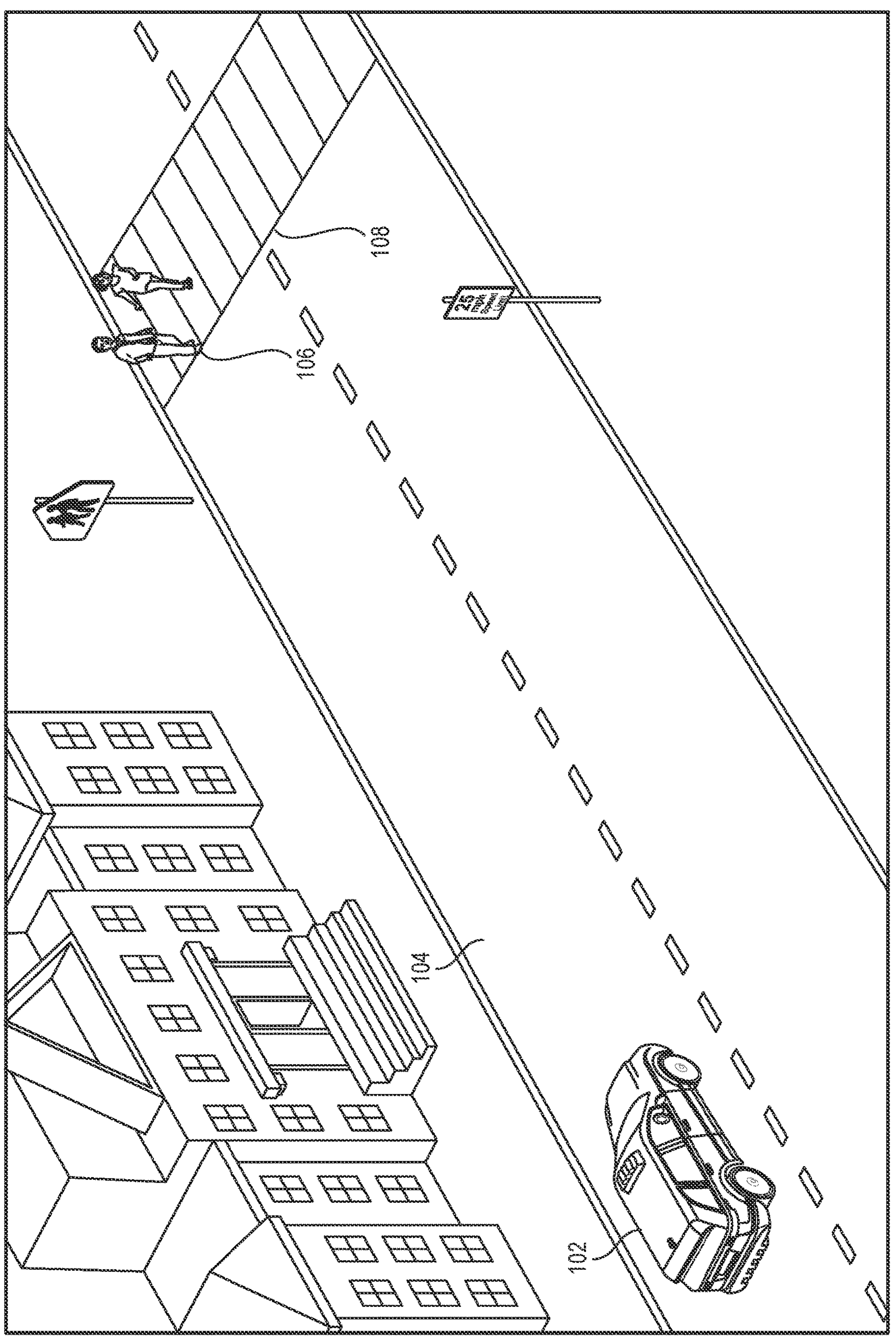
FIG. 1 illustrates an example scenario demonstrating various challenges that may be experienced in conventional approaches to map generation.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. The vehicle may include a variety of systems and subsystems for enabling the vehicle to determine its surroundings so that it may safely navigate to target destinations or assist a human driver, if one is present, with doing the same. As one example, the vehicle may have a computing system for controlling various operations of the vehicle, such as driving and navigating. To that end, the computing system may process data from one or more sensors. For example, a vehicle may have one or more sensors or sensor systems that can recognize hazards, roads, lane markings, traffic signals, etc. Data from sensors may be used to, for example, safely drive the vehicle, activate certain safety features (e.g., automatic braking), and generate alerts about potential hazards.

Safety is a critical aspect of autonomous vehicles. Under conventional approaches, miles per intervention (MPI) is the standard unit of measure when measuring autonomous vehicle performance and safety. In general, MPI measures the average number of miles traveled by one or more autonomous vehicles before a driver or autonomy system disengages and/or a driver or co-pilot intervene (generally referred to as a "disengagement" or "intervention"). MPI has been adopted due to the fact that it is simple, concise, and easy to understand and compute.

However, MPI has multiple shortcomings. For example, a first shortcoming of MPI is that MPI has a weak and inconsistent correlation with actual performance. Not all disengagement situations would have led to a collision or harm if the driver had not disengaged. For example, FIG. 1 illustrates an example scenario that demonstrates various disadvantages associated with conventional approaches. In the example scenario, an autonomous vehicle 102 with a driver is driving down a road segment 104. Two pedestrians 106 are crossing a crosswalk 108. If the autonomous vehicle 102 does not slow down on its own, the driver may disengage autonomous operation to stop the vehicle. However, it is possible that even without slowing down, there would have been sufficient time for the pedestrians 106 to cross safely before the autonomous vehicle 102 reached the crosswalk 108. Despite this, MPI would have been negatively affected by the driver's decision to apply the brakes. Drivers may be more or less conservative on how often and how quickly they disengage, and this may vary across different drivers, across time, across routes depending on driver familiarity, etc. Likewise, an autonomous vehicle operated by an autonomy system configured for navigation may apply the brakes or otherwise intervene even when the intervention is not strictly warranted.

Furthermore, MPI is not well calibrated and encourages gaming. Not all miles driven by an autonomous vehicle are equal. Some road segments may be more difficult to navigate than others, or even the same road segment may be more difficult to navigate under adverse conditions than under ideal conditions. MPI fails to account for such variations, and encourages gaming of the metric by, for example, driving easier or more well-known road segments in order to artificially boost MPI. As yet another consideration, MPI can tempt drivers not to engage as often as they should in order to boost MPI. As such, the user of MPI to measure autonomous vehicle performance creates a perverse incentive for drivers to minimize disengagements, potentially at the expense of public safety. Conventional approaches pose disadvantages in addressing these and other problems.

An improved approach in accordance with the present technology overcomes the foregoing and other disadvantages associated with conventional approaches. In general, the present technology generates improved performance metrics, relating to safety or comfort, for measuring the performance of autonomous vehicles. The improved performance metrics promote increased operational performance. In certain embodiments, the present technology can categorize disengagements into one or more categories (or events). These categories may be indicative of whether or not a disengagement would have led to a negative outcome, and what kind of negative outcome would likely have resulted (e.g., collision, near collision, rule of the road violation, etc.). If a disengagement would not have resulted in a negative outcome, the disengagement is not counted negatively in the performance metric. In this way, drivers, such as safety drivers, can intervene as often as they see fit without adversely affecting the performance metrics. The improved performance metrics also enable apples to apples comparison of AV stacks independently of driving activity that may differ from month-to-month or week-to-week or day-to-day. In various embodiments, this may be achieved, for example, by calibrating the performance metrics and weighting various road segments and/or scenarios based on the frequency and/or difficulty of those road segments and/or scenarios.

The present technology also generates improved AV utility metrics for measuring the utility of autonomous vehicles. Such utility metrics may be based on, for example, a number of rides provided by a transportation network (e.g., a ride service network) that can be handled by autonomous vehicles.

In various embodiments, the improved AV performance metrics and utility metrics disclosed herein can be used to perform and/or to inform various tasks including, for example:

- determining AV progress (e.g., determining whether an AV platform is improving from one month to another);
- comparing AV performance to human driver performance in a ride service network;
- identifying road segments and/or scenarios that the AV platform has mastered and/or needs to improve on;
- determining when an AV platform has mastered a particular training set (e.g., a particular operational design domain, i.e., ODD) and how best to expand that training set for maximum utility; and determining a route from a pick up location to a drop off location that maximizes AV performance and user experience, among others.

More details relating to the present technology are provided below.

Figure 2:
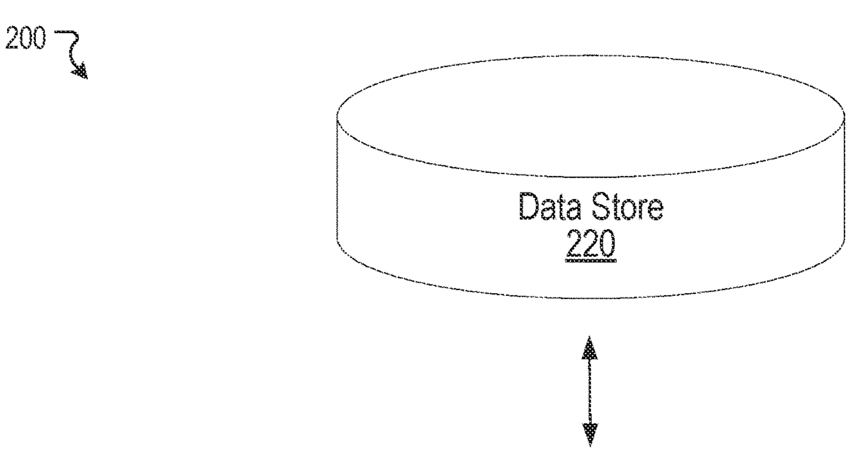
FIG. 2 illustrates an example environment including a transportation management system, according to an embodiment of the present technology.
Figure 2:
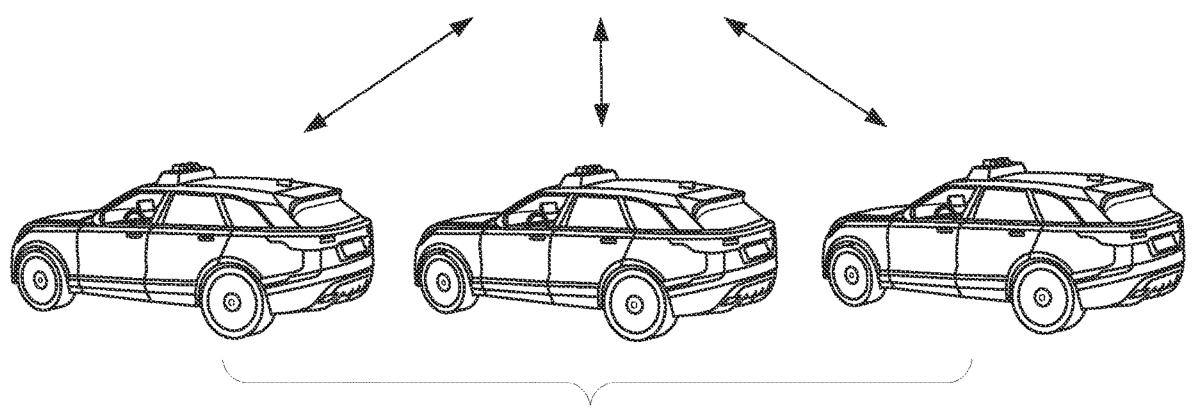

FIG. 2 illustrates an example environment 200, according to an embodiment of the present technology. The environment 200 can include an example transportation management system 202 and a fleet of vehicles 212. The fleet of vehicles 212 may be managed by the transportation management system 202. The transportation management system 202 can be, for example, a transportation management system 660 of FIG. 6. The fleet of vehicles 212 can be, for example, a fleet comprised of one or more vehicles, such as a vehicle 640 of FIG. 6. The fleet of vehicles 212 may include one or more autonomous vehicles, one or more semi-autonomous vehicles, and/or one or more manually operated vehicles. As shown, the transportation management system 202 can include a disengagement categorization module 204, a performance metric module 206, a utility metric module 208, and a metric utilization module 210. In various embodiments, the transportation management system 202 can access sensor data collected by sensors of the fleet of vehicles 212 from various sources and geographic locations. Sensor data may be collected by sensors mounted to the vehicles themselves and/or sensors on computing devices associated with users riding within the fleet of vehicles 212 (e.g., user mobile devices). For example, the transportation management system 202 can access sensor data from the fleet of vehicles 212 in real-time (or near real-time) over one or more computer networks. In another example, the transportation management system 202 can be configured to communicate and operate with at least one data store 220 that is accessible to the transportation management system 202. The at least one data store 220 can be configured to store and maintain various types of data, such as sensor data captured by the fleet of vehicles 212, disengagement information, and the like. In some embodiments, some or all of the functionality performed by the transportation management system 202 and its sub-modules may be performed by one or more computing systems implemented in a vehicle, such as the vehicle 640 of FIG. 6. In some embodiments, some or all of the functionality performed by the transportation management system 202 and its sub-modules may be performed by one or more computing systems associated with (e.g., carried by) one or more users riding in a vehicle and/or participating in a ridesharing service, such as the computing device 630 of FIG. 6. The components (e.g., modules, elements, etc.) shown in this figure and all figures herein are exemplary only, and other implementations may include additional, fewer, integrated, or different components. Some components may not be shown so as not to obscure relevant details.

The disengagement categorization module 204 can be configured to receive disengagement information for one or more autonomous vehicles. Disengagement information for one or more autonomous vehicles may identify each instance during a particular time period during which a driver in an autonomous vehicle disengaged autonomous operation of the autonomous vehicle. The disengagement categorization module 204 can then be configured to categorize each disengagement into a particular category of a plurality of categories.

In certain embodiments, disengagements may include "planned" disengagements as well as "unplanned" disengagements. Planned disengagements may include disengagements that are expected based on an autonomous vehicle's ODD. An autonomous vehicle ODD may comprise three dimensions: (1) environment (e.g., night, day, raining, sunny, foggy, etc.); (2) static map elements (e.g., traffic signs, stop signs, lane markings, a geographic region); and (3) dynamic scenarios (e.g., lane changes, left or right turns, pedestrians, cyclists, etc.). For each of these dimensions, an ODD may define particular situations and/or scenarios that an autonomous vehicle platform is designed to handle. For example, in a particular ODD, an autonomous vehicle may not be configured to handle left turns from a shared middle lane with oncoming traffic. Under such an ODD, the driver would be expected to disengage autonomous operation of the vehicle for any such left turn. Or in another example, a particular ODD may not be designed to drive outside of a particular geographic area. Under this ODD, the driver may be expected to take over manual operation of the autonomous vehicle once the vehicle leaves the geographic area specified in the ODD. In contrast, unplanned disengagements may include any disengagements occurring in scenarios that an autonomous vehicle would be expected to handle under its ODD. In certain embodiments, the disengagement categorization module 204 can filter out planned disengagements to remove some or all planned disengagements, and categorize only unplanned disengagements.

As mentioned above, the disengagement categorization module 204 can be configured to categorize each disengagement (e.g., each unplanned disengagement) into a particular category of a plurality of categories. Each disengagement may be categorized based on a determination as to what likely would have occurred had the driver not intervened (i.e., had the driver not disengaged autonomous operation). In an embodiment, each category of the plurality of categories can correspond to a particular event, and a disengagement can be assigned to a particular category based on whether the particular event would likely have occurred had the driver not intervened. For example, the plurality of categories can include a collision category (e.g., a collision would likely have occurred if the driver had not intervened), a near-collision category (e.g., the autonomous vehicle would have gotten within a threshold distance of colliding with an object if the driver had not intervened), a rule of the road violation category (e.g., the autonomous vehicle would have violated a rule of the road if the driver had not intervened), an elegance violation category (e.g., the autonomous vehicle would have violated a comfort and/or elegance rule if the driver had not intervened), and/or a no adverse outcome category (e.g., no adverse outcome would have occurred even if the driver had not intervened). Many variations are possible. In an embodiment, each disengagement may be assigned to a single category indicative of the most severe expected adverse outcome. For example, a collision would also be a rule of the road violation and an elegance violation, but because a collision is more severe than either of the other two categories, the disengagement would be categorized into only the collision category.

Determination of the likely outcome if the driver had not intervened and the resultant categorization of disengagements may be performed in a variety of ways. In an embodiment, categorization may be performed manually. A human operator may be provided, for example, with video footage, lidar data, radar data, camera data, or other autonomous vehicle sensor data immediately preceding a disengagement, and make a determination as to what likely would have happened if the driver had not disengaged autonomous operation. Human operators may be provided with one or more rules or assumptions that they must comply with in making such determinations. For example, human operators may be instructed not to assume that third parties would change their actions or behaviors based on the autonomous vehicle's behavior (e.g., human operators should not assume that another vehicle would swerve out of the way, or should not assume that a pedestrian would jump out of the way).

In another embodiment, categorization may be performed automatically using a digital simulation. In an embodiment, autonomous vehicle sensor data (e.g., camera data, lidar data, radar data, etc.) captured in the moments immediately preceding a disengagement can be used to perform a simulation of what would likely have occurred if the driver had not intervened. The simulation may assume that all external bodies will continue to behave as they were in the moments preceding the disengagement, and then allow the autonomous vehicle platform to make decisions and take actions in the simulated environment. The simulation can be used to determine a most likely outcome, and the disengagement can be categorized based on the simulation.

The performance metric module 206 can be configured to determine a performance metric (e.g., performance score) for one or more autonomous vehicles and/or an autonomous vehicle platform based on categorization of a set of disengagements associated with the one or more autonomous vehicles and/or the autonomous vehicle platform. In certain embodiments, a performance metric, which may be referred to as "miles per expected event" (MPEE), can be calculated by dividing the number of expected adverse events by the number of miles traveled. Different MPEE values can be calculated for different types and/or groupings of events. For example, consider an example scenario in which an autonomous vehicle (or a fleet of autonomous vehicles running on an autonomous vehicle platform) traveled 100 miles, and there were eight disengagements over those 100 miles. Of those eight disengagements, one was categorized as a collision, two were categorized as near collisions, one was categorized as a rule of the-road violation, two were categorized as elegance violations, and two were categorized into the no adverse outcome category. Various performance metrics can be calculated using this data. For example, this data can be used to calculate that there were 100 miles per expected collision, 50 miles per expected near collision, 100 miles per expected rule of the road violation, or 50 miles per expected elegance violation. In another example, all of the adverse outcomes could be added together to determine that there were 100/6=16.7 miles per expected adverse outcome. By categorizing disengagements into different categories, any disengagements that would not have led to an adverse outcome can be filtered out of the data set. As such, such disengagements do not adversely affect the performance metric. Therefore, drivers can act very cautiously and disengage as frequently as they feel necessary without concern that the disengagements will negatively affect the performance metrics.

In an embodiment, the performance metric module 206 can determine calibrated performance metrics in order to account for changes in autonomous vehicle operation from one time period to another. For example, from one month to another, a lot of changes may take place. Autonomous vehicles may drive on different road segments with different frequencies, and scenario exposures on different road segments may change. Each of these changes would likely have an effect on the performance metric measured during that month.

Figure 3A:
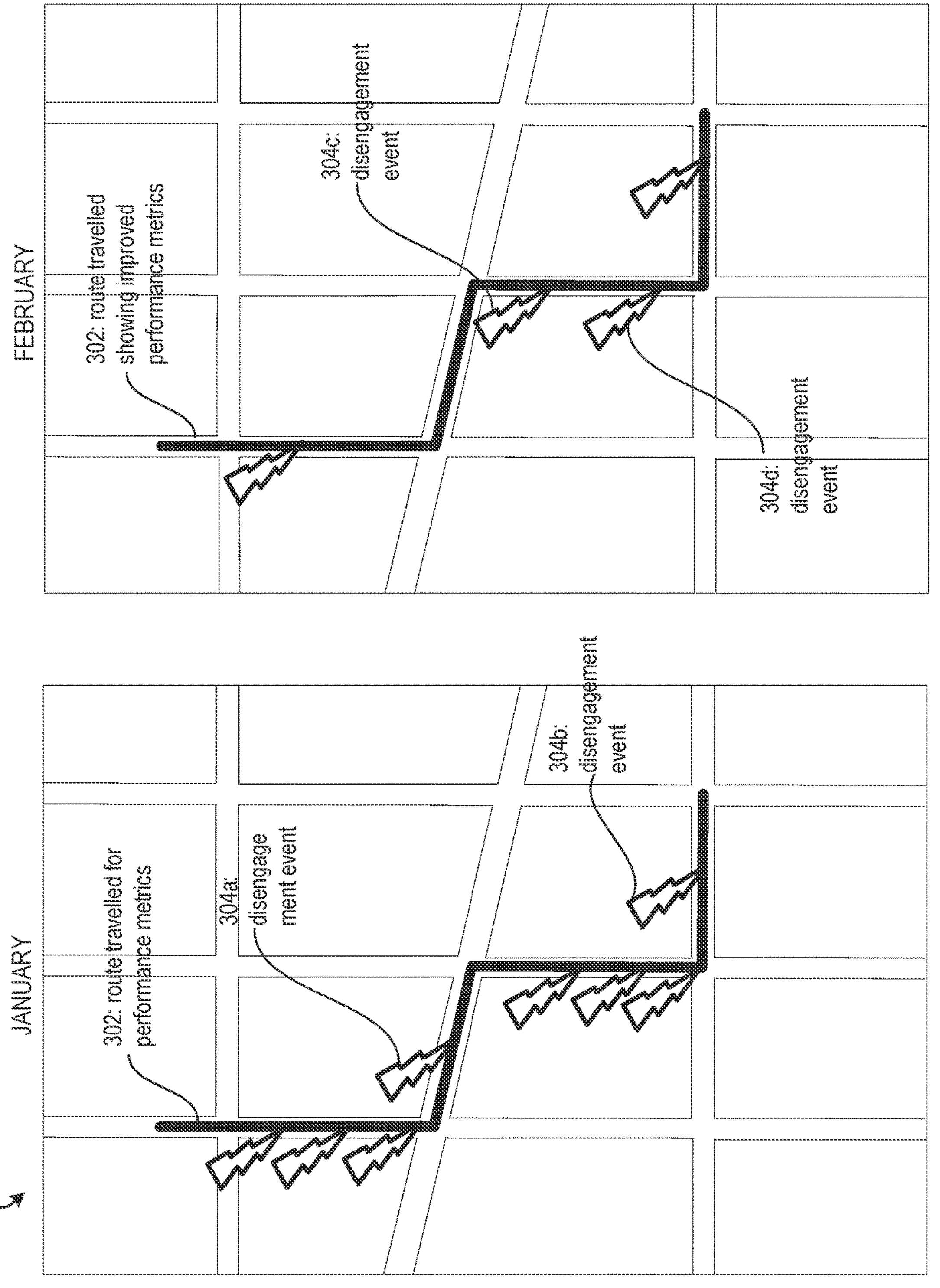
FIGS. 3A-C illustrate example scenarios demonstrating various approaches to determining a safety metric, according to an embodiment of the present technology.
Figure 3B:
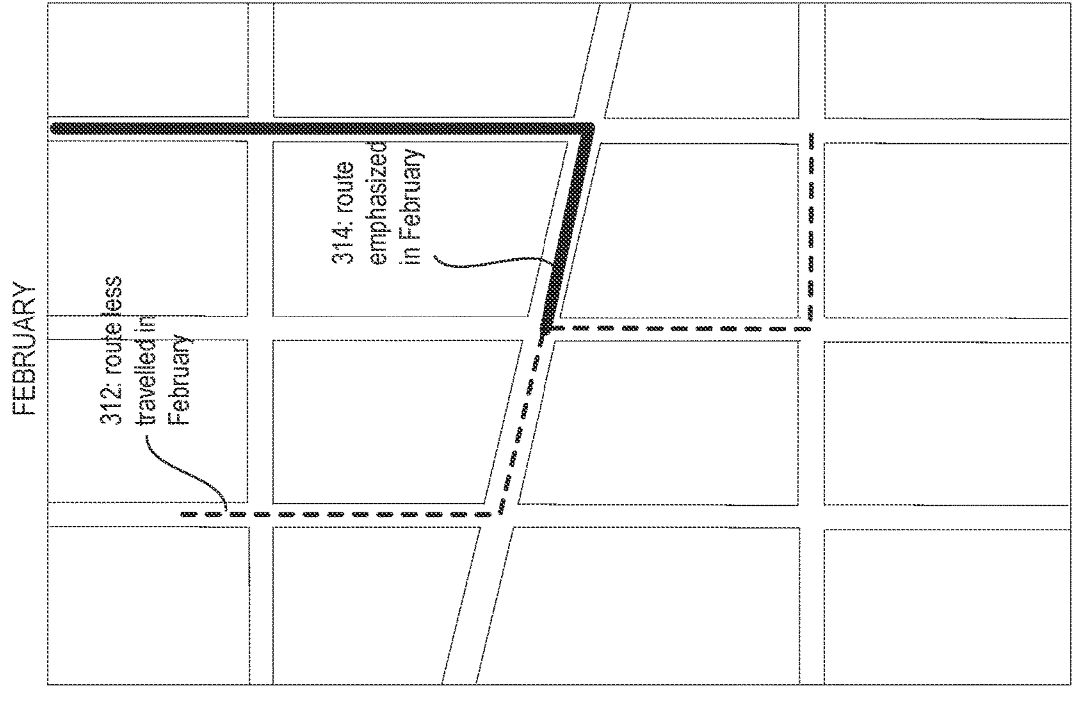
Figure 3B:
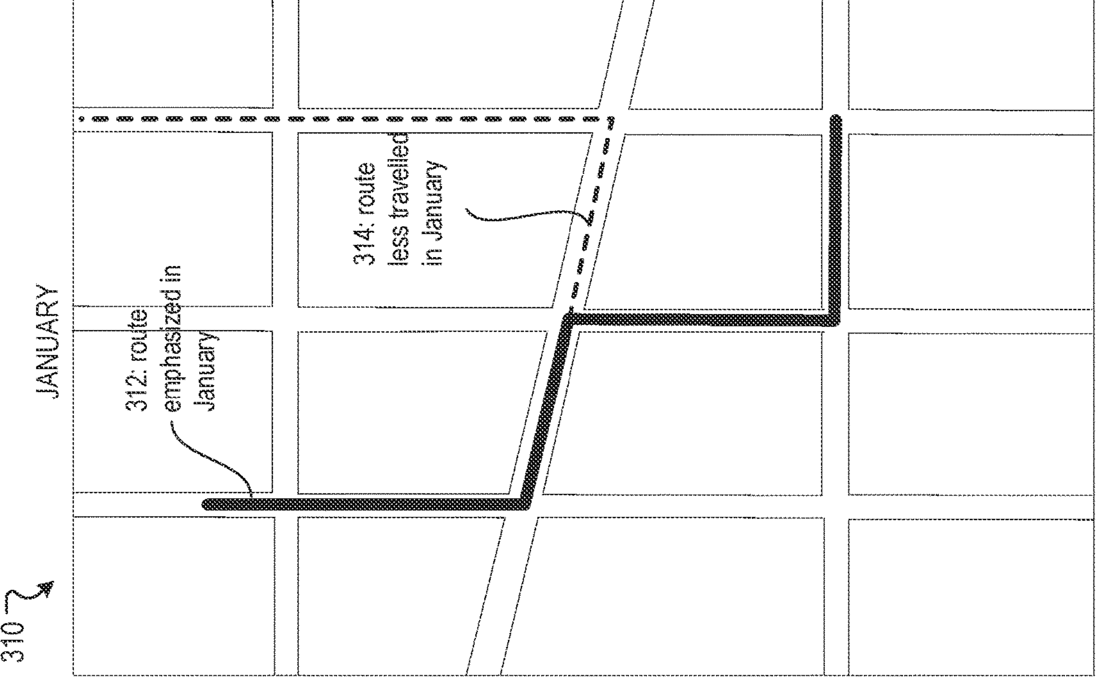

FIGS. 3A and 3B illustrate example scenarios which demonstrate the benefit of calibrating performance metrics using the approaches described herein. In FIG. 3A, in an example scenario 300, an autonomous vehicle may travel a particular route 302 in the month of January a certain number of times. A driver (e.g., a human driver or a system operating the autonomous vehicle) may cause several disengagements during the route, as depicted using lightning bolt icons (e.g., 304*a-d*) in the figures. The autonomous vehicle may also travel the same route 302 the same number of times in the month of February. If the vehicle's MPEE decreases significantly from January to February, it may be safe to assume that the autonomous vehicle is getting better at driving the route 302. However, consider the example scenario 310 shown in FIG. 3B. In the example scenario 310, an autonomous vehicle is driven in the month of January with an emphasis on a first route 312, while a second route 314 is driven only a small number of times. Conversely, in the month of February, the autonomous vehicle is driven with an emphasis on the second route 314, and the first route 312 is driven only a small number of times. This change in driving emphasis may skew the calculated MPEE value for the vehicle, since the autonomous vehicle is exposed to road segments with different frequencies during different months. For example, if the first road segment 312 has a higher MPEE than the second road segment 314 (possibly indicating that the first road segment 312 is more difficult to drive), the month of January may have a significantly higher MPEE than the month of February strictly based on the frequency with which the road segments were traveled in each month, despite the fact that the autonomous vehicle's performance may have remained the same.

In certain embodiments, these problems may be addressed by computing performance metrics per road segment, and computing an overall, calibrated performance metric for a geographic region as a weighted average of the per-road-segment performance metrics. In an embodiment, the position (e.g., latitude/longitude) of each disengagement can be recorded, and each disengagement can be associated with a particular road segment. Each disengagement can be categorized, as discussed above. For a particular period of time (e.g., for each month), these categorized disengagements can be used to compute a mile per expected event (MPEE) for each road segment s driven during that time period. The per-road-segment MPEE can be used to calculate an overall calibrated performance metric (calibrated MPEE, or CMPEE) for all miles driven during the time period (e.g., all miles driven during that month). In an embodiment, the calibrated mile per expected event can be computed according to the following:

$$CMPEE(m, ODD) = \frac{\sum_{s \in S(ODD)} f_s^{ODD} MPEE_s(m)}{\sum_{s \in S(ODD)} f_s^{ODD}}$$

where CMPEE(m, ODD) is the calibrated mile per expected event for a particular month m and a particular ODD, and $f_s^{ODD}$ is the frequency of each segment s. In an embodiment, $f_s^{ODD}$ may be determined based on the canonical frequency with which the road segment was traversed within a ride service network over a particular period of time. For example, $f_s^{ODD}$ for a particular road segment s can be determined by the number of times the road segment s was traversed in a ride service network for a period of time (e.g., one year) divided by the total number of road segment traversals in the ride service network over that period of time. In an embodiment, this frequency may depend on the target ODD. For example, computation of $f_s^{ODD}$ may include only rides in the ride service network that satisfy the ODD (e.g., all rides that occurred within a particular geographic area while the weather was sunny). The $f_s^{ODD}$ may be determined based on a relatively long period of time (e.g., one year, or multiple years) and, as a result, may be relatively stable.

Figure 3C:
Figure 3C:
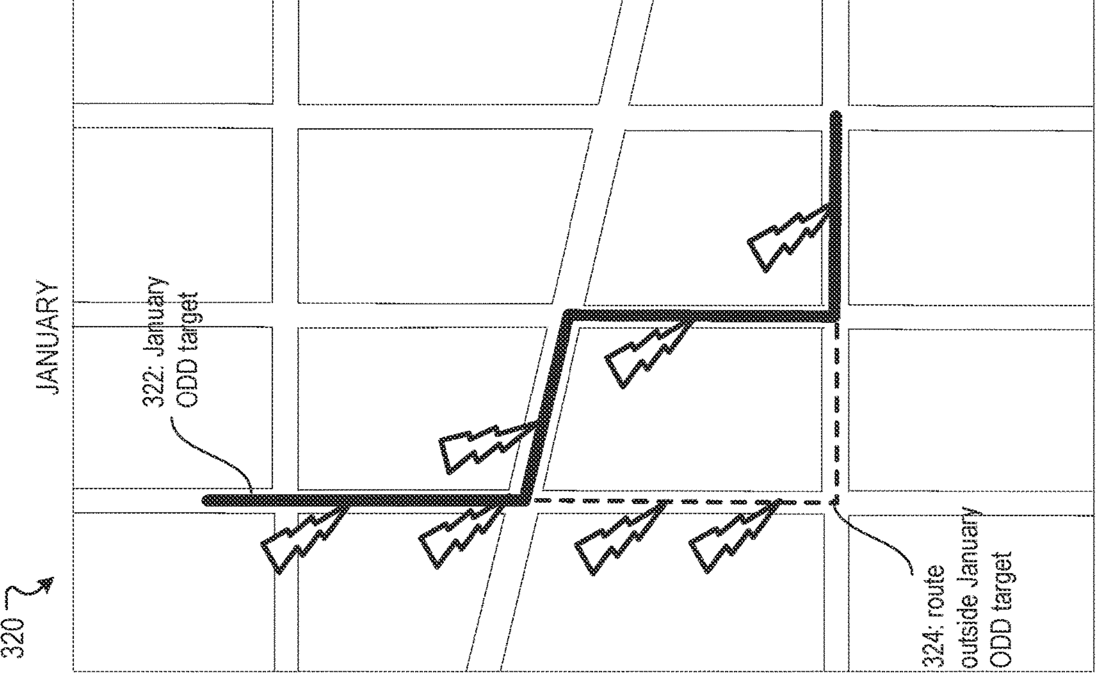

Computation of CMPEE described above assumes that a mile per expected event metric can be calculated for each road segment s. However, certain road segments may not be traversed during a certain period of time (e.g., a certain month), which would mean there is no data from which to calculate an MPEE for those road segments. In one embodiment, this problem may be addressed by choosing a semi-arbitrary default value based on an educated guess of how the autonomous vehicle would have behaved on a segment it has never seen. In certain embodiments, the default value may be experimentally derived. For example, for a particular time period (e.g., each month), a certain proportion of miles (e.g., 10% of miles) can be driven on segments outside of an ODD target for that time period, and data for these non-targeted miles can be recorded separately. The default MPEE value can be computed as the MPEE average over all of these non-targeted segments. FIG. 3C illustrates an example scenario 320. In the example scenario 320, during the month of January, the development target for that month may focus on a route 322. The autonomous vehicle may spend the entire month of January focusing on mastering the route 322. However, 10% of miles can be driven outside of that month's ODD target, as represented by dotted line 324. Disengagement information for the non-targeted segments can be recorded. The MPEE metric for the non-targeted segments can be applied as a default value for all road segments within the ODD for which there is no data in a given month (because those road segments were not traversed). Similarly, in February, the ODD target may change to route 326. Once again, 10% of miles may be driven outside of the route 326 (indicated by dotted line 328) in order to calculate a default MPEE metric. Each road segment in the ODD that was not traversed in a particular month can be assigned the default MPEE metric. Additionally, it should be noted that for road segments that were not traversed in a particular month, such segments can still be assigned a frequency-based weight $f_s^{ODD}$ because the frequency-based weight may be determined based on frequency in a ride service network (including non-autonomous vehicles) over a longer period of time (e.g., one year). Another added benefit of driving a small percentage of miles outside of a development target is to test for overfitting. While autonomous vehicles may be trained by focusing on particular routes for certain periods of time, training autonomous vehicles in this manner may cause the autonomous vehicle to become too specifically tied to those particular routes. By driving outside of those routes, it can be determined whether the AV performs reasonably well on the new routes or whether the AV performs significantly worse on the new routes, which may indicate that overfitting is occurring.

While the above methodology discusses calculating MPEE metrics per road segment, and calculating a calibrated MPEE metric as a weighted average of the per-road-segment MPEE values, other variations are possible. For example, MPEE may be calculated per scenario type. In this regard, rather than assigning each disengagement to a particular road segment, each disengagement can be assigned to a particular scenario that was occurring when the disengagement occurred. Scenario information can include information describing objects, events, context, and risk associated with navigation through the geographic region. For example, scenarios can include children walking through a crosswalk, pedestrians crossing a road, debris blocking a lane of a highway, hazardous activity involving other vehicles, to name some examples. A scenario can be associated with a set of features (e.g., objects, road features, contextual features) which, when detected, can be used to recognize the scenario. By assigning disengagements to a particular scenario (and also assigning each disengagement to a particular event/category, as described above), per-scenario MPEE metrics can be calculated, and a calibrated MPEE can be calculated as a weighted average of the per-scenario MPEE metrics based on the frequency with which each scenario type is encountered (e.g., in a ride share service). Many variations are possible.

Returning to FIG. 2, the utility metric module 208 can be configured to determine a utility metric (e.g., a utility score) for one or more autonomous vehicles. The utility metric, or utility score, may be indicative of a number and/or proportion of rides in a ride service network that can be handled by an autonomous vehicle. The utility metric module 208 can be configured to determine a subset of rides in a ride service network that can be executed by one or more autonomous vehicles based on autonomous vehicle eligibility criteria. In an embodiment, the utility metric module 208 can be configured to determine a maximum utility metric. The maximum utility metric may be a metric determined based on an assumption that an autonomous vehicle platform can deliver perfect efficacy for a particular ODD, and then determining the percentage of ride service network rides in a given geographic area that could be handled by the autonomous vehicle platform. For example, an ODD may specify that an autonomous vehicle platform can handle all rides during sunny, clear weather for a particular set of roads. In this example scenario, the autonomous vehicle eligibility criteria may include all rides that satisfy the ODD. In a ride service network, 10 out of 100 rides may be rides that occurred on the particular set of roads during sunny, clear weather. In this case, the maximum utility metric may be 10/100=0.1. In certain embodiments, each ride may be weighted by its distance, such that the maximum utility metric is not only the number of AV-executable rides divided by the total number of rides, but rather the total number of miles in all AV-executable rides divided by the total number of miles in all rides serviced by the ride service network. The maximum utility metric may be indicative of how useful a particular ODD is for servicing rides on a ride service network. For example, if a current ODD specifies sunny, clear weather for a particular set of roads, but 0% of ride service network rides occurred during sunny weather on that particular set of roads, that ODD may not be very useful. Conversely, a different ODD may specify clear, sunny weather for a different set of roads, and 50% of ride service network rides may have occurred during sunny weather on that different set of roads. In this scenario, the maximum utility metric can be used to determine that the second ODD should be utilized rather than the first for training an AV platform, and operation of autonomous vehicles associated with the AV platform can be controlled so that navigation of the autonomous vehicles is conducted in accordance with the second ODD.

Figure 4:
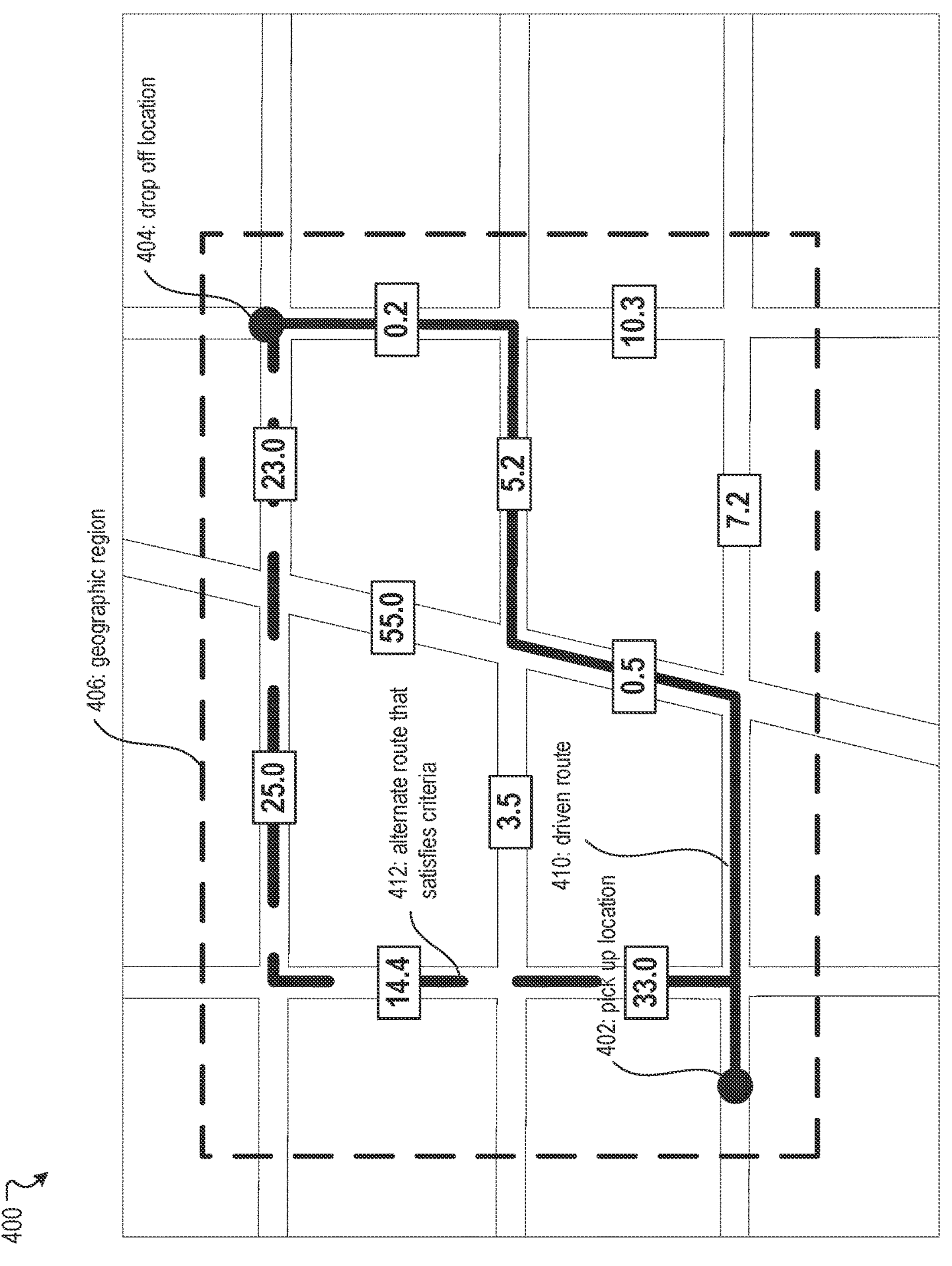
FIG. 4 illustrates an example approach to determining a utility metric, according to an embodiment of the present technology.

In an embodiment, the utility metric module 208 can be configured to determine a predicted utility metric. In contrast to the maximum utility metric, the predicted utility metric does not assume perfect efficacy for a particular ODD, but rather utilizes actual, measured efficacy for a particular ODD. Actual efficacy for a target ODD may be determined, for example, based on the performance metrics (e.g., MPEE and/or CMPEE) disclosed herein. In an embodiment, autonomous vehicle eligibility criteria may include ODD-based criteria as well as performance metric-based criteria. For example, per-segment MPEE values can be used to determine whether, for a particular ride request comprising a pick up/drop off location pair, a route can be determined which (1) falls within the ODD for an AV platform and (2) each road segment in the route has a per-segment MPEE that is greater than a threshold value. If both of these conditions are true, the ride request can be categorized as a ride request that is AV-executable. However, if a route that satisfies both of these requirements cannot be found, the ride request may be marked as not AV-executable. The predicted utility metric can be calculated as either the number of rides that are AV-executable divided by the total number of rides in the ride service network and/or as the total number of miles in all AV-executable rides divided by the total number of miles for all rides. FIG. 4 illustrates an example scenario 400 in which a determination is made as to whether a particular ride request in a ride service network should be classified as AV-executable or not AV-executable. In the example scenario 400, a ride request includes a pick up location 402 and a drop off location 404. Furthermore, a geographic region defined by an ODD is depicted by a box 406, and each road segment is labeled with a per-segment MPEE value. In the example scenario 400, a ride request can be categorized as AV-executable if a route can be determined from the pick up location 402 to the drop off location 404 wherein each road segment falls within the geographic region 406 and each road segment has a per-segment MPEE of greater than 1.0. The actual route traveled by a human driver that satisfied the ride request is indicated by a line 410. This route would not satisfy the per-segment MPEE threshold of 1.0. However, this ride request can still be categorized as AV-executable because an alternative route exists that satisfies both the geographic region criteria and the MPEE threshold criteria (e.g., route 412). In certain embodiments, pick up/drop off locations may be considered to satisfy the geographic region criteria as long as the pick up/drop off locations are within a threshold distance of being within the geographic region defined by an ODD.

In certain embodiments, even when a transportation request is associated with a feasible AV-executable route, additional factors associated with the route may be taken into account in issuing or recommending the route. Such factors can include, for example, delay, inconvenience, ride comfort, transportation cost, etc. For example, a pick up location, a drop off location, a distance between a current location and the pickup location, or a distance from the drop off location to a destination for the AV-executable route may be inconvenient for a passenger. As another example, the AV-executable route may not be the most direct route available and may cause the ride to be delayed or be more costly in comparison to a human-executable route that is more direct. The AV-executable route can be associated with other disadvantages, such as discomfort. In these instances, a human driver and a human-executable route (or non AV-executable route) may be recommended even when a transportation request can be otherwise associated with a feasible AV-executable route. In some embodiments, such additional factors associated with a route (AV-executable or human-executable) may be weighed or balanced for or against performance metrics associated with another route. For example, if performance metrics associated with an AV-executable route are satisfactory but not excellent, an AV-executable route may be offered to a passenger if it offers substantial savings over a human-executable route in time, distance, convenience, or cost. As another example, if performance metrics of an AV-executable route indicate that an AV is safer than a human driver, then the AV-executable route may be offered even if the AV-executable route is slightly more costly. Accordingly, a comparison can be performed between the human-executable route or its related metrics (e.g., performance metrics and metrics relating to delay, inconvenience, ride comfort, etc.) versus the AV-executable route or its related metrics. Based on the comparison of the routes or their respective metrics, the human-executable route or the AV-executable route can be selected. For example, based on an associated ODD, an autonomous vehicle from a fleet of vehicles can be assigned to the transportation request based on selection of the AV-executable route. In some embodiments, the weighing or balancing of the additional factors may be reflected in determination of a utility metric. For example, if navigation of an autonomous vehicle on an AV-executable route is likely to be received poorly by a passenger because of excessive delay or substantial discomfort, the utility metric module 208 may treat the AV-executable route as only conditionally AV-executable and accordingly adjust utility metric.

In an embodiment, the utility metric may be determined based on various scenarios and associated ODDs. For example, scenarios contained within an ODD can be identified or enumerated. For each scenario, respective exposure frequencies (e.g., how likely the scenario is encountered in reality) can be determined. Based on the scenarios and their respective exposure frequencies, a fraction of road segments that the ODD can cover with autonomous vehicles may be determined. The fraction can indicate the utility metric.

Returning to FIG. 2, the metric utilization module 210 can be configured to utilize the various performance metrics and/or utility metrics described herein to take certain actions. Some example use cases include the following:

- AV to AV comparison: CMPEE values from one month to another can be compared to determine whether the AV platform is performing better in February than it did in January (i.e., is February's CMPEE value higher than January's CMPEE value?).
- AV-to-human comparison: readiness of an AV platform can be determined by comparing AV CMPEE and/or MPEE to the frequency of collisions or adverse events by human drivers in a ride service network. If an AV platform outperforms human drivers by a threshold amount, the AV platform can be determined to be ready for operation in a particular geographic region and/or for a particular ODD.
- Expansion determination: road segments or geographic areas with MPEE values lower than a threshold value may be identified as potential candidates for an ODD target so that the AV platform can be trained to perform better on those road segments.
- Overfitting can be identified based on a determination that an average MPEE for road segments outside of an ODD target are lower than the MPEE for an ODD target by a threshold amount. In response, the ODD target can be changed to correct the overfitting.
- If the MPEE and/or CMPEE for a particular geographic region and/or a particular set of scenarios reaches a threshold value, the ODD can be expanded to include a larger geographic region and/or more scenarios.

In an embodiment, when a ride request is received, the metric utilization module 210 can determine whether the ride request is AV-executable based on autonomous vehicle eligibility criteria, which may include ODD-based criteria and performance metric-based criteria. For example, the ride request may be associated with a pick up location and a drop off location. The metric utilization module 210 can determine whether a route can be determined from the pick up location and the drop off location which satisfies the ODD (e.g., a route that falls entirely within a geographic region defined by the ODD), and for which each road segment in the route satisfies a minimum MPEE threshold criteria. If the ride request is determined to be AV-executable, the metric utilization module 210 can assign an autonomous vehicle to service the ride request. If the ride request is determined not to be AV-executable, the metric utilization module 210 can assign a human driver to service the ride request. Furthermore, if a ride request is determined to be AV-executable, the metric utilization module 210 can determine a route for the ride request based on performance metrics and operation of an autonomous vehicle can be controlled so that navigation of the autonomous vehicle follows the route. For example, the ride request can determine a route that has a highest average MPEE, a highest weighted MPEE, wherein each per-segment MPEE is weighted based on distance (i.e., length of the road segment), and the like.

In an embodiment, the utility metrics disclosed herein can be used to determine an ODD for an AV platform. For example, an ODD can be identified and/or defined to maximize the maximum utility metric and/or the predicted utility metric.

FIG. 5A illustrates an example method 500, according to an embodiment of the present technology. At block 502, the example method 500 can receive disengagement information associated with one or more autonomous vehicles, the disengagement information identifying a plurality of disengagements of an autonomy system during operation of the one or more autonomous vehicles. At block 504, the example method 500 can categorize each disengagement of the plurality of disengagements based on a plurality of categories, wherein a first category of the plurality of categories is associated with disengagement that would not have led to a negative outcome. At block 506, the example method 500 can determine a performance metric associated with the one or more autonomous vehicles based on the categorizing each disengagement of the plurality of disengagements. At block 508, the example method 400 can evaluate autonomous vehicle performance of the one or more autonomous vehicles based on the performance metric.

Many variations to the example method are possible. It should be appreciated that there can be additional, fewer, or alternative steps performed in similar or alternative orders, or in parallel, within the scope of the various embodiments discussed herein unless otherwise stated.

Figure 5B:
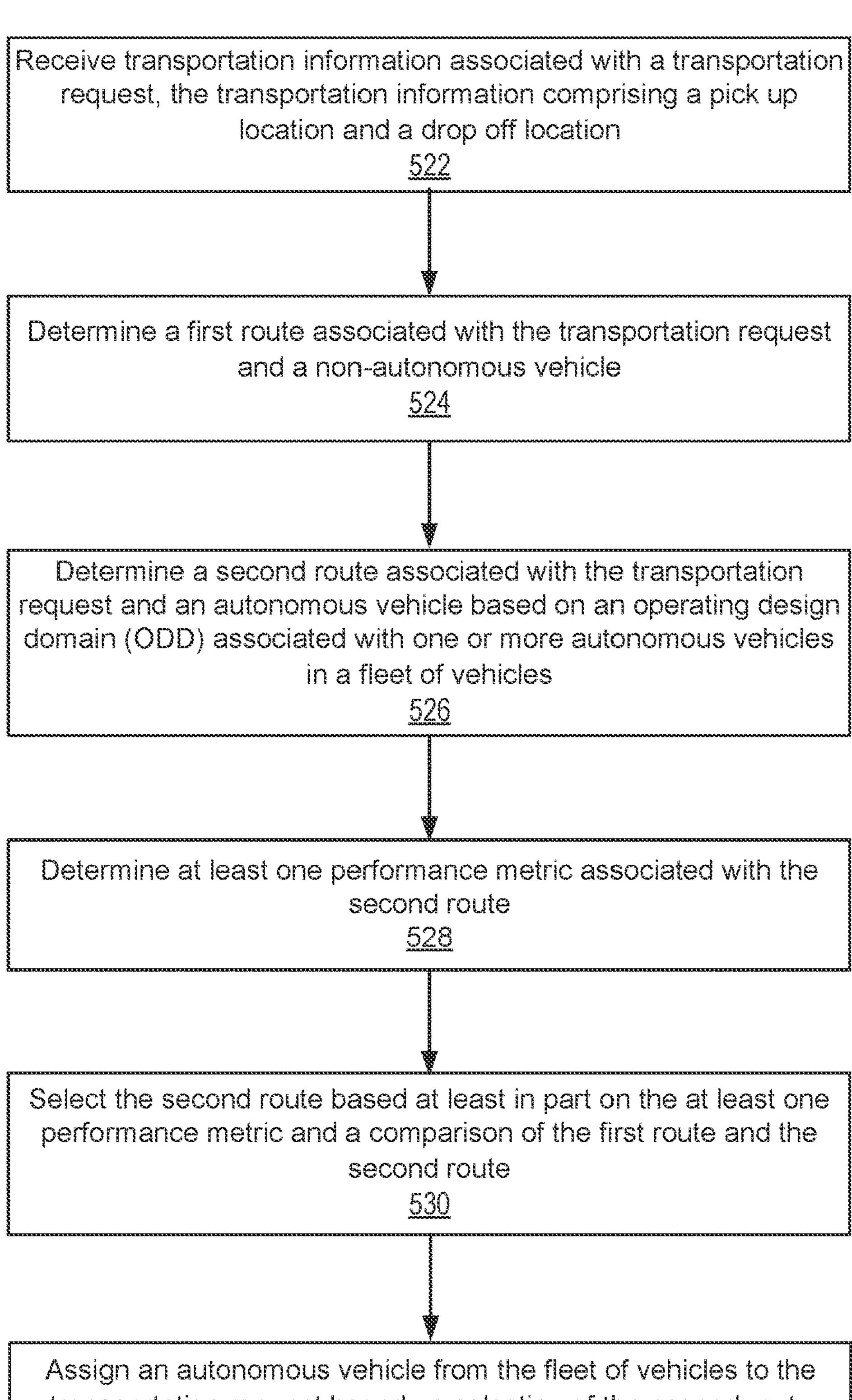
FIG. 5B illustrates an example method, according to an embodiment of the present technology.

FIG. 5B illustrates an example method 520, according to an embodiment of the present technology. At block 522, the example method 520 can receive transportation information associated with a transportation request, the transportation information comprising a pick up location and a drop off location. At block 524, the example method 520 can determine a first route associated with the transportation request and a non-autonomous vehicle. At block 526, the example method 520 can determine a second route associated with the transportation request and an autonomous vehicle based on an operating design domain (ODD) associated with one or more autonomous vehicles in a fleet of vehicles. At block 528, the example method 520 can determine at least one performance metric associated with the second route. At block 530, the example method 520 can select the second route based at least in part on the at least one performance metric and a comparison of the first route and the second route. At block 532, the example method 520 can assign an autonomous vehicle from the fleet of vehicles to the transportation request based on selection of the second route.

Many variations to the example method are possible. It should be appreciated that there can be additional, fewer, or alternative steps performed in similar or alternative orders, or in parallel, within the scope of the various embodiments discussed herein unless otherwise stated.

FIG. 5C illustrates an example method 540, according to an embodiment of the present technology. At block 542, the example method 540 can determine a first utility metric associated with a region and first autonomous vehicle eligibility criteria, wherein the first utility metric is determined based on a first plurality of rides and a subset of the first plurality of rides that can be successfully executed within the region based on the first autonomous vehicle eligibility criteria. At block 544, the example method 540 can determine a second utility metric associated with the region and second autonomous vehicle eligibility criteria, wherein the second utility metric is determined based on a second plurality of rides and a subset of the second plurality of rides that can be successfully executed within the region based on the second autonomous vehicle eligibility criteria. At block 546, the example method 540 can select an autonomous vehicle associated with the first autonomous vehicle eligibility criteria to drive in the region based on a comparison of the first utility metric and the second utility metric.

Many variations to the example method are possible. It should be appreciated that there can be additional, fewer, or alternative steps performed in similar or alternative orders, or in parallel, within the scope of the various embodiments discussed herein unless otherwise stated.

Figure 6:
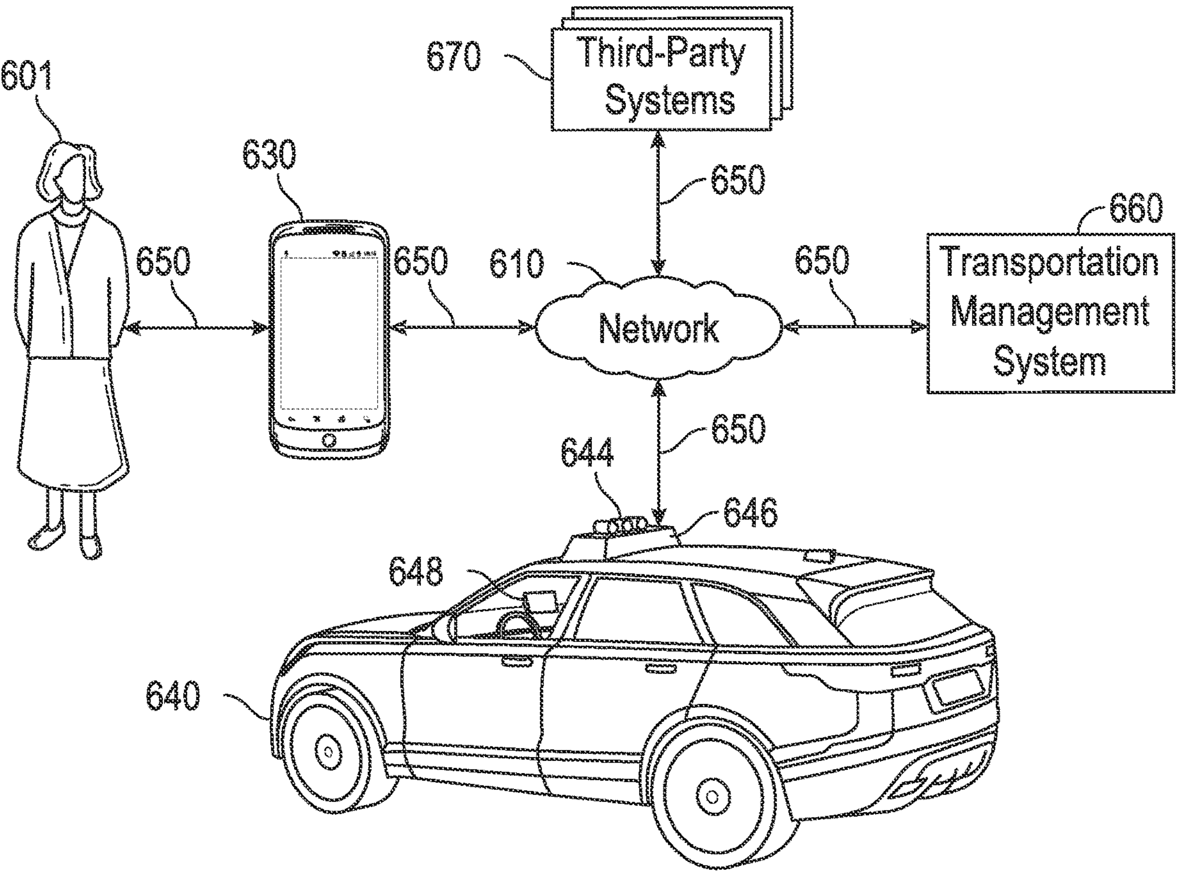
FIG. 6 illustrates an example block diagram of a transportation management environment, according to an embodiment of the present technology.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules shown in FIG. 2 may be implemented by one or more computing systems of the transportation management system 660. In some embodiments, some or all modules shown in FIG. 2 may be implemented by one or more computing systems in the vehicle 640. In some embodiments, some or all modules shown in FIG. 2 may be implemented by the user device 630.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, California, the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
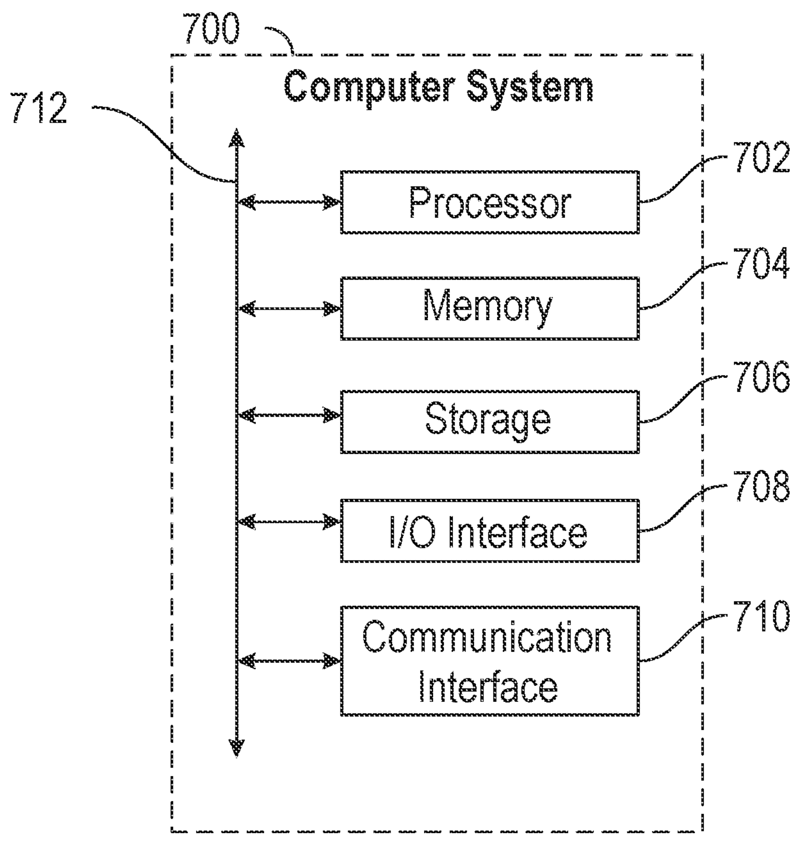
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:

receiving, by a computing system, a location of a user and a destination of the user associated with a transportation request;

determining, by the computing system, a plurality of routes based on the location and the destination, wherein determining the plurality of routes comprises:

determining a first route to serve the transportation request using a non-autonomous vehicle, and determining a second route to serve the transportation request using an autonomous vehicle by selecting a plurality of road segments that (1) fall within an operating design domain (ODD) associated with a fleet of autonomous vehicles and (2) satisfy a per-segment performance metric threshold, and assembling the plurality of selected road segments as the second route, wherein the second route is different from the first route when at least one segment of the first route is outside of the ODD or fails the per-segment performance metric threshold;

selecting, by the computing system, a route from the plurality of routes based on factors related to user experience, wherein the factors comprise a Miles Per Expected Event (MPEE value for each road segment in an ODD target, and for an un-traversed road segment in the ODD target, a default MPEE value is assigned based on sensor and disengagement data collected from a vehicle driving on road segments outside of the ODD target; and dispatching, by the computing system, a vehicle based on the selected route.

2. The computer-implemented method of claim 1, wherein the factors related to user experience comprise at least one of a potential time delay, a distance between a current location and a pickup location, a distance from a drop off location to a destination, or comfort level.

3. The computer-implemented method of claim 1, wherein the selecting the route from the plurality of routes comprises:

for each of the plurality of routes, determining a performance metric associated with the route based on a weighted average of performance metric values associated with road segments of the route.

4. The computer-implemented method of claim 3, further comprising:

determining the performance metric values associated with road segments of the route based on expected outcomes of disengagements that occurred in the road segments.

5. The computer-implemented method of claim 4, wherein the disengagements are categorized into at least an adverse outcome category and a no adverse outcome category based on expected outcomes determined by simulation of the disengagements.

6. The computer-implemented method of claim 5, wherein the performance metric values associated with road segments of the route are determined based on the expected outcomes of the disengagements in the adverse outcome category.

7. The computer-implemented method of claim 5, wherein the simulation of the disengagements is based on an assumption that external bodies continue behaviors indicated by sensor data captured prior to the disengagements.

8. The computer-implemented method of claim 1, wherein the determining the second route associated with the transportation request and the autonomous vehicle comprises:

determining that each road segment of a candidate route falls within the ODD, wherein each road segment is associated with a per-segment MPEE (miles per expected event) score; and in response to determination that the MPEE score of each road segment is greater than a threshold, determining the candidate route is executable by the autonomous vehicle.

9. A system comprising:

at least one processor; and a memory storing instructions that, when executed by the at least one processor, cause the system to perform operations comprising:

receiving a location of a user and a destination of the user associated with a transportation request;

determining a plurality of routes based on the location and the destination, wherein determining the plurality of routes comprises:

determining a first route to serve the transportation request using a non-autonomous vehicle, and determining a second route to serve the transportation request using an autonomous vehicle by selecting a plurality of road segments that (1) fall within an operating design domain (ODD) associated with a fleet of autonomous vehicles and (2) satisfy a per-segment performance metric threshold, and assembling the plurality of selected road segments as the second route, wherein the second route is different from the first route when at least one segment of the first route is outside of the ODD or fails the per-segment performance metric threshold;

selecting a route from the plurality of routes based on factors related to user experience, wherein the factors comprise a Miles Per Expected Event (MPEE) value for each road segment in an ODD target, and for an un-traversed road segment in the ODD target, a default MPEE value is assigned based on sensor and disengagement data collected from a vehicle driving on road segments outside of the ODD target; and dispatching a vehicle based on the selected route.

10. The system of claim 9, wherein the selecting the route from the plurality of routes comprises:

for each of the plurality of routes, determining a performance metric associated with the route based on a weighted average of performance metric values associated with road segments of the route.

11. The system of claim 10, wherein the operations further comprise:

determining the performance metric values associated with road segments of the route based on expected outcomes of disengagements that occurred in the road segments, wherein the disengagements are categorized into at least an adverse outcome category and a no adverse outcome category based on expected outcomes determined by simulation of the disengagements.

12. A non-transitory computer-readable storage medium including instructions that, when executed by at least one processor of a computing system, cause the computing system to perform operations comprising:

receiving a location of a user and a destination of the user associated with a transportation request;

determining a plurality of routes based on the location and the destination, wherein determining the plurality of routes comprises:

determining a first route to serve the transportation request using a non-autonomous vehicle, and determining a second route to serve the transportation request using an autonomous vehicle by selecting a plurality of road segments that (1) fall within an operating design domain (ODD) associated with a fleet of autonomous vehicles and (2) satisfy a per-segment performance metric threshold, and assembling the plurality of selected road segments as the second route, wherein the second route is different from the first route when at least one segment of the first route is outside of the ODD or fails the per-segment performance metric threshold;

selecting a route from the plurality of routes based on factors related to user experience, wherein the factors comprise a Miles Per Expected Event (MPEE) value for each road segment in an ODD target, and for an un-traversed road segment in the ODD target, a default MPEE value is assigned based on sensor and disengagement data collected from a vehicle driving on road segments outside of the ODD target; and dispatching a vehicle based on the selected route.

13. The non-transitory computer-readable storage medium of claim 12, wherein the selecting the route from the plurality of routes comprises:

for each of the plurality of routes, determining a performance metric associated with the route based on a weighted average of performance metric values associated with road segments of the route.

14. The non-transitory computer-readable storage medium of claim 13, wherein the operations further comprise:

determining the performance metric values associated with road segments of the route based on expected outcomes of disengagements that occurred in the road segments, wherein the disengagements are categorized into at least an adverse outcome category and a no adverse outcome category based on expected outcomes determined by simulation of the disengagements.

* * * * *